Nov. 10, 1942.  C. T. BOLEN  2,301,510
FOOD COVER
Filed Jan. 30, 1940
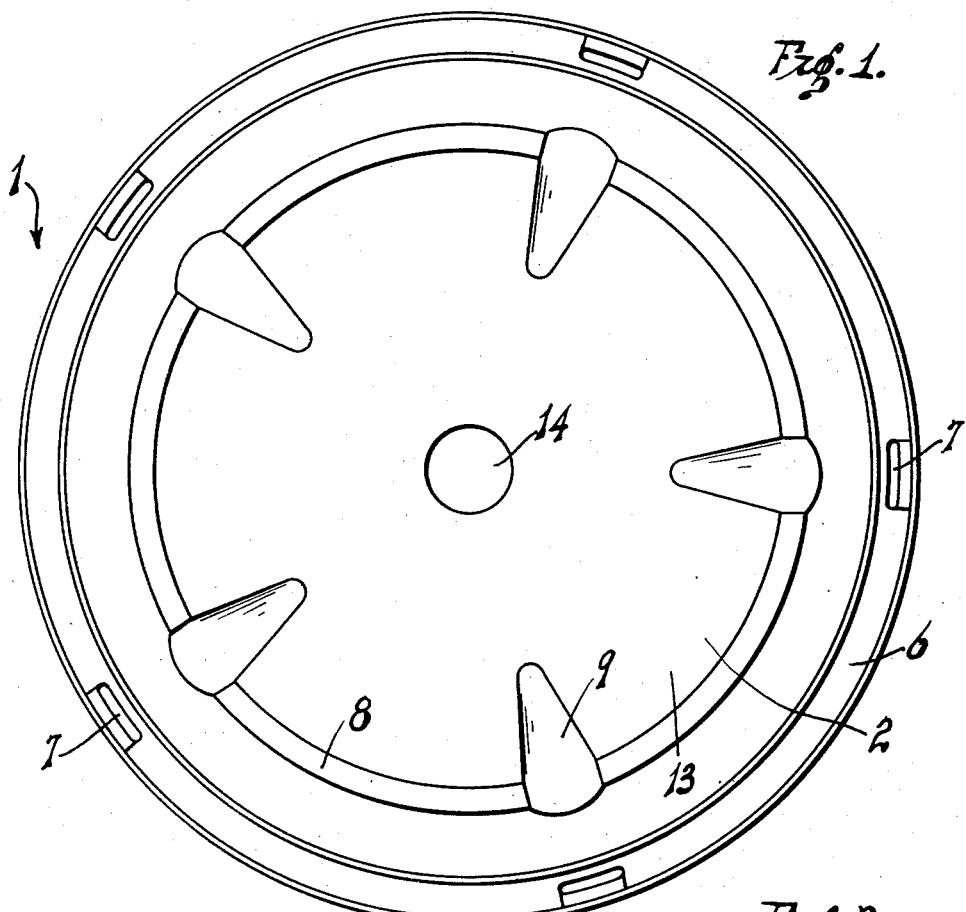
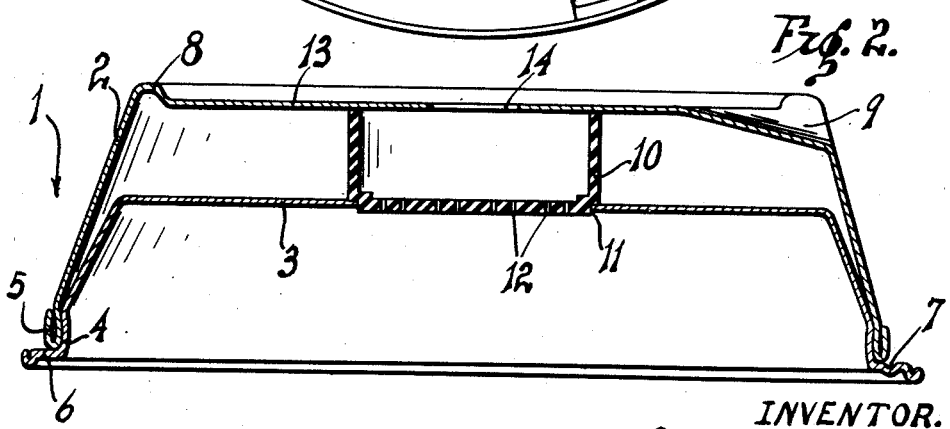
INVENTOR.
CARL T. BOLEN.
BY
ATTORNEY.

Patented Nov. 10, 1942

2,301,510

UNITED STATES PATENT OFFICE 2,301,510

FOOD COVER

Carl T. Bolen, Long Beach, Calif.

Application January 30, 1940, Serial No. 316,370

2 Claims. (Cl. 62—1)

This invention relates to a food cover adapted to be placed over either hot or cold food dishes for the purpose of maintaining the temperature of the food in an effective manner, and without injury to the food.

An object of my invention is to provide a novel food cover, including a double wall, the outer shell being readily removable from the inner shell for purposes of cleaning, replacement or the like.

Another object is to provide a novel food cover of the character stated, provided with a cup adapted to receive ice or the like for cooling purposes, a portion of the cup being perforated and protruding through the inner shell for the purpose of effectively chilling food or maintaining the temperature of cold foods enclosed by the cover.

Still another object is to provide a novel ice retaining cup arranged between the inner and outer shells of the cover, the outer shell acting as a lid for the cup, said retaining cup being simple, inexpensive and effective in operation.

A feature of my invention is to provide a novel means of providing air spaces or openings so that when food covers are stacked one upon the other, adequate air circulation is provided.

Other objects, advantages and features of invention may appear from the accompanying drawing, the subjoined detailed description, and the appended claims.

In the drawing:

Figure 1 is a top plan view of my food cover.

Figure 2 is a transverse sectional view of the same.

My food cover 1 consists of an outer shell 2, and an inner shell 3. These shells are spaced apart a suitable distance for the purpose of providing a dead air insulating space, and also a space in which condensed steam from hot foods are trapped and prevented from falling back onto the food. The upper surfaces of the shells 2 and 3 are substantially flat, as shown, the purpose of which will be further described.

The outer shell 2 is removably attached or held on the shell 3 in the following manner:

The inner shell 3 is provided with a substantially flat or slightly indented annular space 4, and the lower edge of the outer shell 2 fits into or against this space 4, thus securely holding the two shells in assembled position but permitting the outer shell to be removed by pulling upward on the same. A reinforcing bead 5 may be provided on the lower edge of the outer shell 2, if desired. A substantially flat rim 6 is integrally formed on the inner shell 3 and this rim normally rests on the edge of the plate containing the food.

In order to permit air to circulate between the rim of the plate and the lower face of the flange or rim 6, I provide a plurality of indentations 7 in the flange or rim 6, thus spacing the food cover slightly from the food dish and permitting a circulation of air. The food covers, when placed on various dishes, are frequently stacked one on top of the other, and for this reason, the upper wall of the outer shell 2 is preferably flat, substantially as shown. I may also provide an upwardly extending bead 8 around the periphery of the outer shell.

A plurality of indentations 9 are provided on the top of the outer shell 2 whereby air is permitted to pass between the shell and the superimposed plate when they are stacked, as previously stated. A cup 10 is removably mounted in the food cover and is arranged between the inner and outer shells, as shown in Figure 2. The cup 10 fits into an opening 11 in the top of the inner shell 3, and a plurality of holes or openings 12 are provided in the bottom wall of the cup 10, and in that portion of the bottom wall which projects into the opening 11.

The cup 10 is made of a suitable non-conductive material such as plastic glass, rubber or the like. The top of the cup is open and when in use the top wall 13 of the outer shell presses tightly against the top of the cup, thus closing the same. A hole 14 extends through the wall 13, and opens into the cup 10 to permit circulation of air, which is necessary during the chilling of foods. The cup 10 is filled with ice, solid carbon dioxide, or the like, and cold air moving downwardly over this ice is chilled, then passes through the holes 12, and thence onto the food, which is within the confines of the inner shell 3.

Having described my invention, I claim:

1. A food cover comprising spaced outer and inner shells, means removably securing the shells together, a cup removably mounted in the cover, said cup being positioned between the inner and outer shells, said inner shell having an opening therein, said cup having perforations in the bottom thereof, the perforated bottom fitting in the opening in the inner shell, the top wall of said outer shell being flat and fitting against the top of the cup, said outer shell having indentations in the upper edge, and a hole opening into the cup.

2. A food cover comprising spaced outer and inner shells, means removably securing the shells together, a cup removably mounted in the cover, said cup being positioned between the inner and outer shells, said inner shell having an opening therein, said cup having perforations in the bottom thereof, the perforated bottom fitting in the opening in the inner shell, the top wall of said outer shell being flat and fitting against the top of the cup, said outer shell having indentations in the upper edge, and a hole opening into the cup, a flange on the inner shell, said flange having a plurality of downwardly extending projections whereby the flange is spaced from a plate on which it is placed.

CARL T. BOLEN.